US010924001B2

(12) United States Patent
Li et al.

(10) Patent No.: US 10,924,001 B2
(45) Date of Patent: Feb. 16, 2021

(54) GATE DRIVER CONTROLLER AND ASSOCIATED DISCHARGE METHOD

(71) Applicant: TEXAS INSTRUMENTS INCORPORATED, Dallas, TX (US)

(72) Inventors: Xiong Li, Allen, TX (US); Toru Tanaka, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 233 days.

(21) Appl. No.: 16/109,276

(22) Filed: Aug. 22, 2018

(65) Prior Publication Data
US 2020/0067400 A1    Feb. 27, 2020

(51) Int. Cl.
    H02M 1/32       (2007.01)
    H02M 7/5387     (2007.01)
    H02P 27/08      (2006.01)
    H02M 1/08       (2006.01)

(52) U.S. Cl.
    CPC .............. *H02M 1/32* (2013.01); *H02M 1/08* (2013.01); *H02M 7/5387* (2013.01); *H02P 27/08* (2013.01); *H02M 2001/322* (2013.01)

(58) Field of Classification Search
    None
    See application file for complete search history.

(56) References Cited

U.S. PATENT DOCUMENTS

| | | | | |
|---|---|---|---|---|
| 3,575,652 A | * | 4/1971 | Snyder ..................... | H02P 7/29 388/830 |
| 4,361,787 A | * | 11/1982 | Negishi ................... | G11B 15/43 318/53 |
| 5,243,522 A | * | 9/1993 | Salzmann ............... | F16H 59/08 477/121 |
| 6,445,879 B1 | * | 9/2002 | Youn ...................... | D06F 37/304 388/811 |

(Continued)

FOREIGN PATENT DOCUMENTS

EP    1418664 A2    5/2004

OTHER PUBLICATIONS

De Almeida Carlos et al., "Series Compensator Based on Cascaded Transformers Coupled With Three-Phase Bridge Converters," IEEE Transactions on Industry Applications, vol. 53, No. 2, Mar./Apr. 2017, 9 pages.

(Continued)

*Primary Examiner* — Zoheb S Imtiaz
(74) *Attorney, Agent, or Firm* — Mark Allen Valetti; Charles A. Brill; Frank D. Cimino

(57) ABSTRACT

A gate driver controller, inverter circuit apparatus, and associated discharge method for electric vehicles are disclosed. An example gate driver controller includes a mode determiner to set a mode of operation of the gate driver. The example device includes a gate driver control to control the gate driver to set the gate driver to: a) on, b) off, or c) generate a pulse width modulation signal. When in a first operating mode and set to on, stored energy is to be (Continued)

transferred from a capacitor to a motor winding inductor via a power transistor activated by the gate driver to dissipate a first portion of the stored energy. When in a second operating mode, a second portion of the stored energy is to be transferred from the motor winding inductor to the power transistor to dissipate the second portion of the stored energy.

12 Claims, 14 Drawing Sheets

(56) References Cited

U.S. PATENT DOCUMENTS

| | | | | |
|---|---|---|---|---|
| 7,646,160 B2* | 1/2010 | Chen | ................ | G01R 31/42 |
| | | | | 318/490 |
| 2001/0026141 A1* | 10/2001 | Hirata | ................ | H02P 9/08 |
| | | | | 318/727 |
| 2004/0246641 A1* | 12/2004 | Sugimoto | ............. | H02M 5/458 |
| | | | | 361/91.1 |
| 2005/0275386 A1* | 12/2005 | Jepsen | ................ | H02M 7/4807 |
| | | | | 322/9 |
| 2009/0153095 A1* | 6/2009 | Ahn | ................ | H02P 25/092 |
| | | | | 318/701 |
| 2011/0031939 A1* | 2/2011 | Funaba | ................ | H02J 9/002 |
| | | | | 320/166 |
| 2017/0093324 A1* | 3/2017 | Saha | ................ | H02P 29/0241 |
| 2018/0183375 A1* | 6/2018 | Liu | ................ | H02P 27/06 |
| 2018/0278144 A1* | 9/2018 | Nakano | ................ | H02M 1/32 |

OTHER PUBLICATIONS

Search Report for PCT Application No. PCT/US19/46997, dated Nov. 28, 2019, 1 page.

* cited by examiner

GATE DRIVER CONTROLLER AND ASSOCIATED DISCHARGE METHOD

FIELD OF THE DISCLOSURE

This disclosure relates generally to electric vehicle power supplies and associated circuitry, and, more particularly, to a gate driver controller and associated discharge method.

BACKGROUND

Power management circuitry can be used to drive circuits in applications from automotive to communications and industrial technologies. For example, transportation electrification plays a key role to address global environmental issues. A high voltage power electronics system is one of the core elements in an electric vehicle (EV) or hybrid electric vehicle (HEV). In a HEV/EV traction inverter system, different high voltage energy storage elements (HVESEs) are used on a direct current (DC) link. The HVESEs include a high voltage battery pack, a high voltage DC link capacitor, and an X capacitor.

The HVESEs are to be discharged to a safe voltage level to prevent passengers from receiving an electric shock once a vehicle in which the elements are housed is parked and/or under an emergency condition. Dedicated active discharge circuits are used to discharge excess energy stored in the HVESEs. Active discharge is mandated in Europe, for example. However, extensive and bulky active discharge circuits are expensive and complex, adding to cost as well as impacting operability, configurability, and maintenance/repair of HVESEs and associated power management circuitry. There is a need for improved circuits and methods for electric discharge in automotive power circuits.

BRIEF SUMMARY

Certain examples provide an inverter circuit apparatus to control a motor, the motor including a plurality of motor winding inductors. The example apparatus includes a plurality of power transistors to, when switched on, convert stored energy to provide an alternating current to a motor connected to the inverter circuit apparatus. The example apparatus includes a plurality of gate drivers, each of the plurality of gate drivers to provide an input to a corresponding power transistor in the plurality of power transistors to switch the respective power transistor on or off. The example apparatus includes a controller to control the plurality of gate drivers to dissipate stored energy from a capacitor connected to the inverter circuit apparatus according to a first operating mode and a second operating mode. When in the first operating mode, the stored energy is to be transferred from the capacitor to at least a portion of the motor winding inductors via at least one activated power transistor to dissipate a first portion of the stored energy. When in the second operating mode, a second portion of the stored energy is to be transferred from the motor winding inductors to at least one activated power transistor to dissipate the second portion of the stored energy.

Certain examples provide a controller device for a gate driver of an inverter circuit. The example device includes a mode determiner to set a mode of operation of the gate driver. The example gate driver is to provide an input to a power transistor to switch the respective power transistor on or off. The example mode of operation is to include a first operating mode and a second operating mode. The example device includes a gate driver control to control the gate driver to set, based on the mode of operation, the gate driver to: a) on, b) off, or c) generate a pulse width modulation signal. When in the first operating mode and set to on, stored energy is to be transferred from a capacitor connected to the inverter circuit to a motor winding inductor connected to the inverter circuit via the power transistor activated by the gate driver to dissipate a first portion of the stored energy. When in the second operating mode, a second portion of the stored energy is to be transferred from the motor winding inductor to the power transistor to dissipate the second portion of the stored energy.

Certain examples provide a discharge method for an electric vehicle circuit. The example method includes evaluating, using at least one processor, a stored charge on a capacitor connected to a motor via an inverter circuit in comparison to a threshold; and, when the stored charge exceeds the threshold, triggering, using the at least one processor, a discharge state for the inverter circuit. While in the discharge state, the example method includes: configuring the inverter circuit in a first operating mode to dissipate a first portion of the stored charge through inductor windings of a motor connected to the inverter circuit; and configuring the inverter circuit in a second operating mode to dissipate a second portion of the stored charge through a power transistor of the inverter circuit connected to the inductor windings of the motor. The example method includes monitoring a remainder of the stored charge after dissipating the first portion and the second portion to determine whether the remainder of the stored charge exceeds the threshold; and, when the remainder does not exceed the threshold, exiting the discharge state to a normal operating state.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
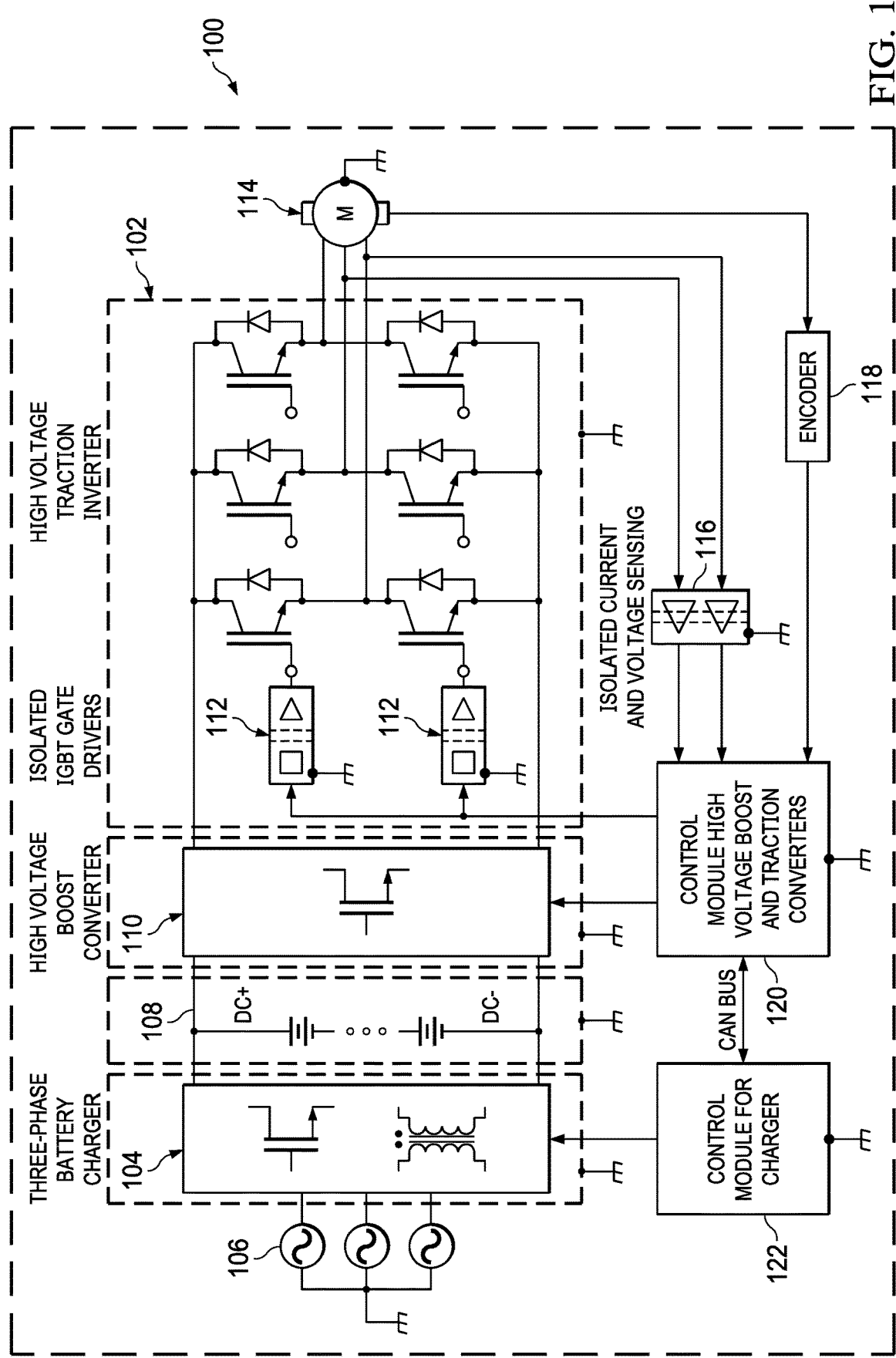
FIG. 1 illustrates an example high voltage power electronics system including a high voltage traction inverter.

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized and that logical, mechanical, electrical and/or other changes may be made without departing from the scope of the subject matter of this disclosure. The following detailed description is, therefore, provided to describe example implementations and not to be taken as limiting on the scope of the subject matter described in this disclosure. Certain features from different aspects of the following description may be combined to form yet new aspects of the subject matter discussed below.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Certain examples provide improved active discharge of electric charge stored in a high voltage energy storage element (HVESE) in an electric vehicle (EV) or hybrid EV (HEV) power electronics system, such as an EV/HEV traction inverter system, etc. Certain examples enable transfer and control of energy from a high voltage battery system to high voltage components such as traction motor, air conditioning, starters, etc., as well as lower voltage components such as infotainment systems, safety systems, etc.

Certain examples implement an active discharge function by introducing new operation/operating modes to the traction inverter. With introduction of the new operating modes, energy stored in HVESEs are dissipated through motor winding resistance and on-state resistance of power transistors, for example. Certain examples further provide a new gate driver integrating the active discharge function.

For example, while traditional systems must include dedicated discharge circuitry that is used to dissipate and/or otherwise discharge a stored charge in the system, certain examples provide an active discharge function or state without requiring additional active discharge circuitry. Instead, new operating modes are introduced by which a controller can control a traction inverter circuit to discharge a stored charge in the circuit. When not in the discharge mode, the inverter circuit can be used with respect to a motor for normal operation. Thus, the controller enables the same circuit to be used in a normal operating mode and a discharge mode to provide safe discharge of stored energy while eliminating the need for dedicated discharge circuitry that would occupy valuable circuit area and expose the circuit to additional sources of error.

For example, a three-phase traction inverter circuit can be controlled in a high voltage power electronics system using two more inverter operation modes introduced to dissipate energy stored in HVESEs through motor winding resistance and power transistor on-state resistance. Two or more of the three inverter phases are involved in the newly introduced operation modes, and any two phases of the inverter(s) can be used.

Thus, prior approaches faced a technical problem if excess charge building up in a circuit, and the only solution was to add extra hardware to that circuit for the sole purpose of removing the excess charge. The additional hardware complicated the circuit, exposing more points of possible error/failure, and was inefficient and ineffective at dissipating excess energy built up in other circuit components. In response to this technical problem of how to remediate charge buildup without negatively impacting circuit area and complexity, certain examples leverage existing inverter circuit components with a controller to provide operation modes for the inverter circuitry in conjunction with motor windings to dissipate charge build-up when in a certain mode.

FIG. 1 illustrates an example high voltage HEV/EV power electronics system 100 including a high voltage traction inverter. The example system 100 can be used for motor control to provide power and control to one or more electric motors and support one or more powertrain topologies, for example. The circuit 100 can transfer energy stored in a high voltage battery system into instantaneous, multiphase, alternating current (AC) power for a traction drive, etc.

The example high voltage power electronics system 100 includes a three-phase traction inverter 102. In the example of FIG. 1, a three-phase rectifier 104 is used to convert alternating current (AC) power from a main grid 106 to direct current (DC) power to charge a high voltage battery 108. The example circuit 104 includes a two-stage architecture that combines a front-end power factor correction (PFC) stage and an isolated DC/DC stage to provide a stream for the DC/AC inverter 102. A boost converter 110 is used to boost the battery voltage to a few hundred volts for cases in which battery voltage is relatively low. Gate drivers 112, in conjunction with the three phase DC/AC inverter 102, are used to convert DC power from the battery 108 into AC power to generate a rotating magnetic field for a motor 114, for example. In certain examples, motor speed, phase voltages, and phase currents are sensed in order to realize close loop controls 116 of the motor speed and torque. An encoder 118 provide motor 114 position information to a control module 118 for high voltage boost and traction converters, for example. In the example circuit 100 of FIG. 1, two separate control modules 120, 122 are used to control the battery charger 104 and traction inverter 102, 112 independently.

In certain examples, silicon or silicon carbide metal oxide semiconductor field effects transistors (MOSFETs) can be used to implement one or more components of the circuit 100 such as the AC/DC converter 104, etc. A switching frequency is up to several hundred kHz in order to size down passive components, for example. Insulated gate bipolar transistors (IGBTs) can be used to implement the traction inverters 102 because of their high current density, for example. The switching frequency is up to a few tens of kHz, for example.

Figure 2:
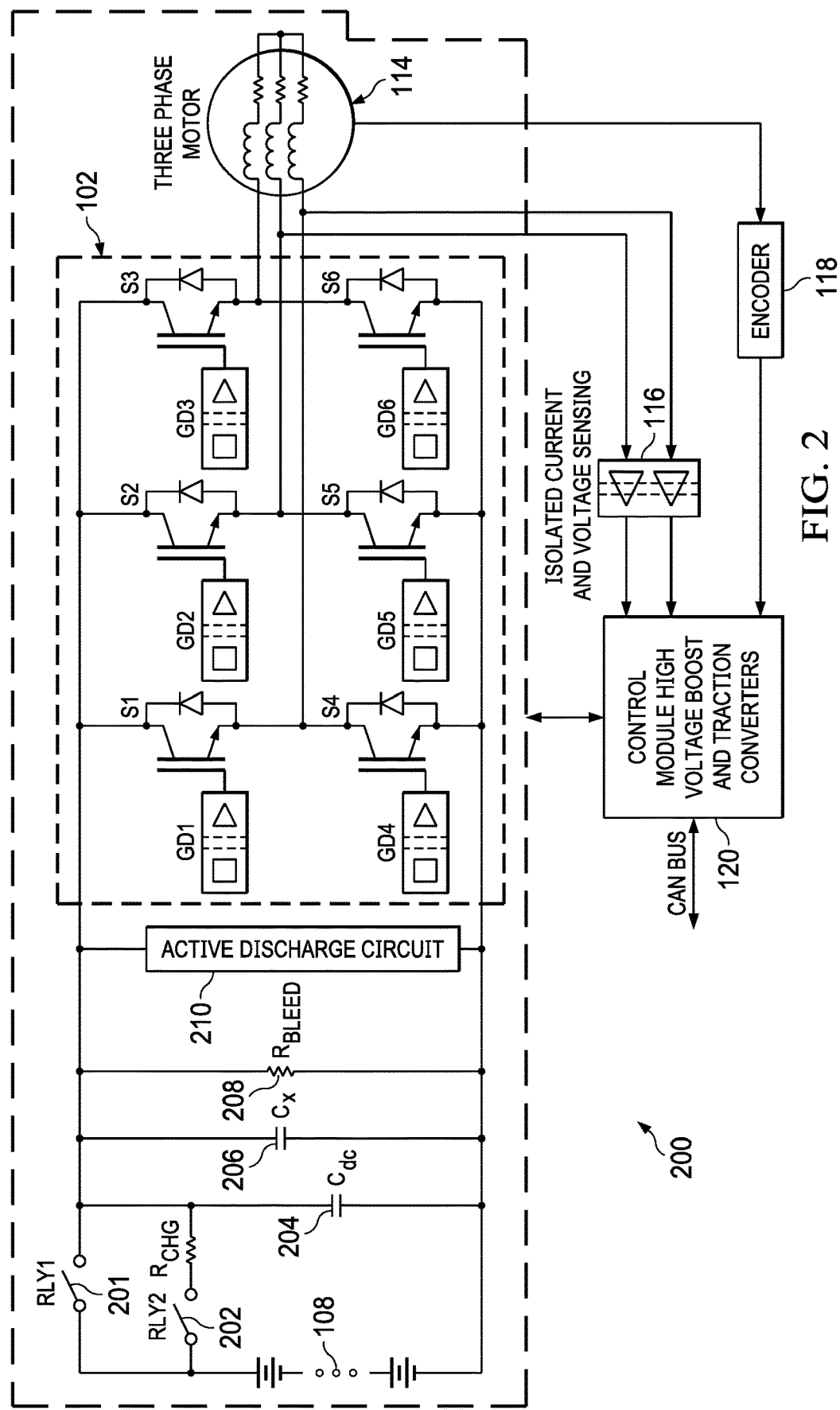
FIG. 2 illustrates a more detailed view of a portion of the example high voltage power electronics system of FIG. 1 including a dedicated active discharge circuit.

FIG. 2 illustrates a more detailed view of a portion of the example high voltage power electronics system 100. In the example of FIG. 2, different high voltage energy storage elements (HVESEs) can be used on the DC link 108 (e.g., a high voltage battery pack, etc.) when the DC link 108 is connected via relays/switches 201, 202. Those high voltage elements include a high voltage DC link capacitor 204 and an X capacitor 206. The HVESEs are to be discharged to a safe voltage level to prevent passengers from electric shock once a vehicle in which the electronics 100 are included is parked or under some emergency conditions, for example. The discharge function can be implemented with a bleed resistor 208 and a dedicated active discharge circuit 210. An example active discharge circuit 210 that combines a power resistor and power transistor is presented in FIG. 3. The power transistor is switched ON and OFF to bleed charge stored in the HVESEs. This active discharge circuit 210 is additional circuitry added specifically to discharge the stored charge from the HVESEs and comes at a real estate cost of large circuit footprint solution size as well as high system cost, for example.

Figure 3:
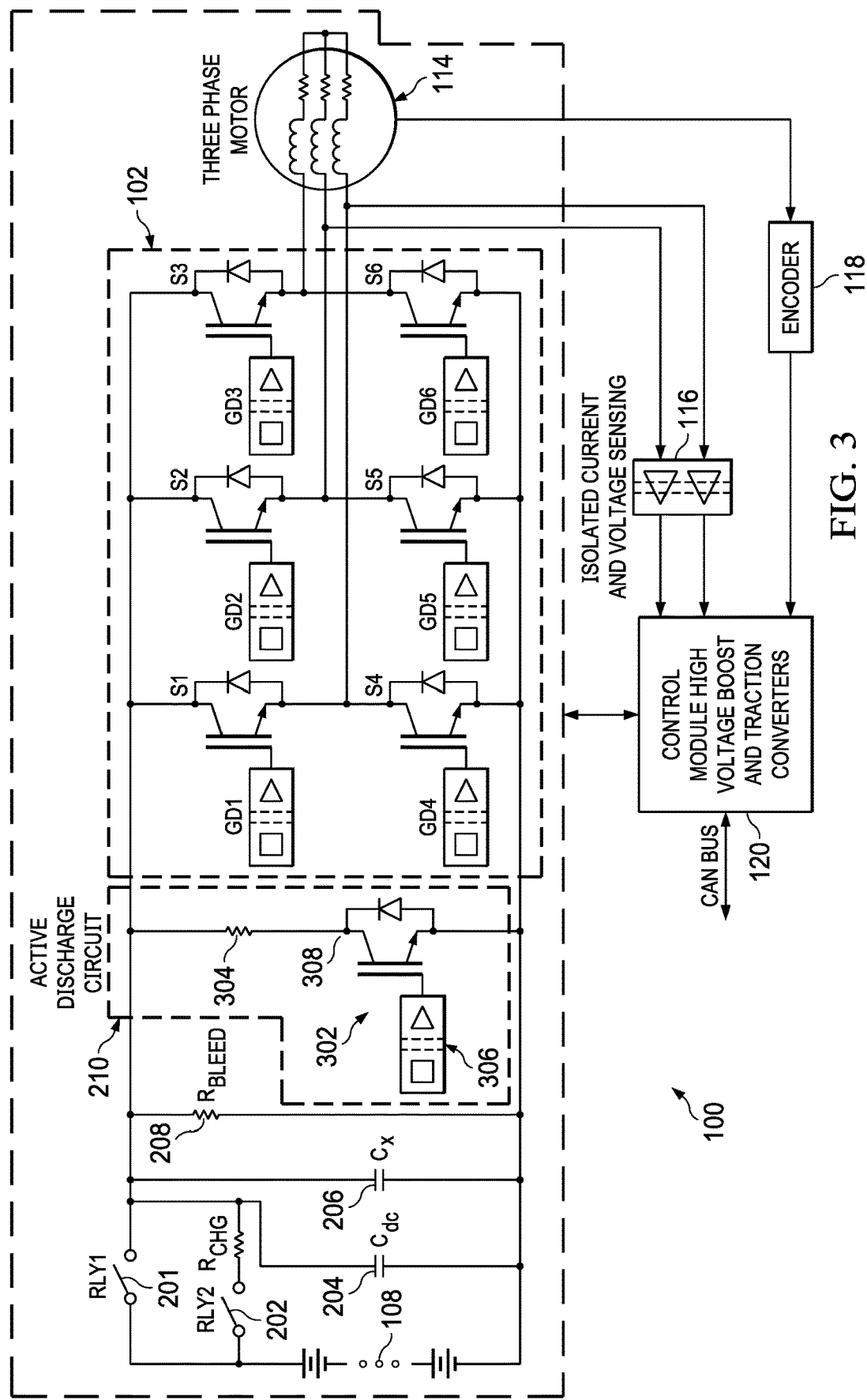
FIG. 3 is a schematic illustration of an example high voltage power electronics system including the dedicated active discharge circuit of FIG. 2.

In the example of FIG. 3, the active discharge circuit 210 combines a power transistor device 302 with a high-power resistor 304 but provides no short circuit support, while occupying much circuit real estate and contributing significantly to the expense of the high voltage traction inverter system 100. The active discharge circuit 210 includes the high-power resistor 304 with a gate driver (GD) 306 and a switching device 308, such as an insulated-gate bipolar transistor (IGBT) and/or other power semiconductor electronic switch.

The gate driver 306 is a power amplifier that accepts a low-power input from a controller integrated circuit (IC) and produces a high-current drive input for the gate of a high-power transistor such as an IGBT or power metal-oxide-semiconductor field-effect-transistor (MOSFET). The gate driver 306 can be implemented on-chip or as a discrete component, for example.

The example active discharge circuit 210 helps to discharge energy stored in HVESEs by dissipating the energy on the high-power resistor 304 by switching 302, for example.

In contrast to the dedicated additional circuitry of FIGS. 2-3, certain examples provide a three-phase traction inverter for a high voltage power electronics system in an EV/HEV system. In the example three-phase inverter, two more inverter operation modes are introduced to dissipate energy stored in HVESEs through motor winding resistance and power transistor on-state resistance. Two or more of the three inverter phases are involved in the newly introduced operation modes, and any two phases of the inverter(s) can be used.

Figure 4A:
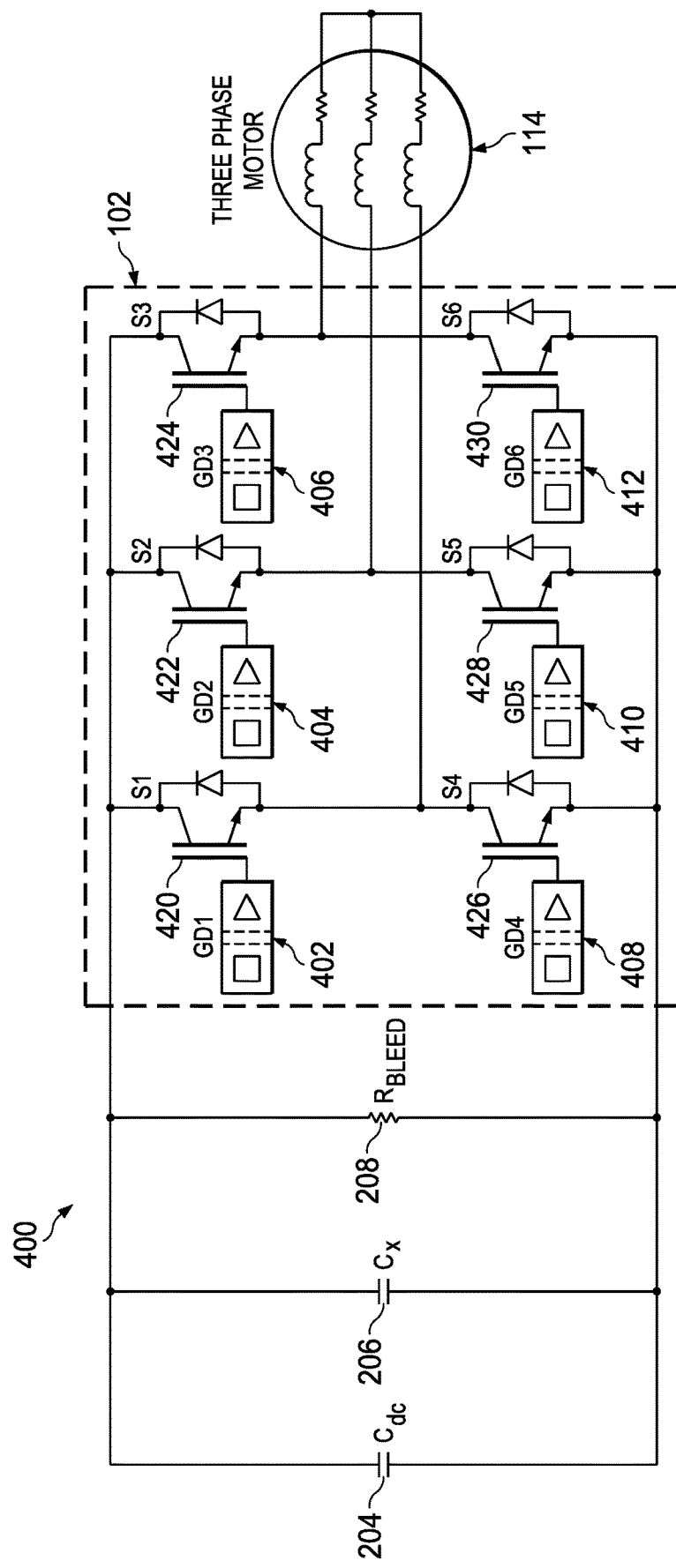
FIGS. 4A-4B illustrate an example portion of the electronic system of FIG. 1 configured to accommodate stored energy dissipation from connected components without the active discharge circuit of FIGS. 2-3.

FIG. 4A illustrates an example portion 400 of the electronic system 100 configured to accommodate charge/energy dissipation from connected HVESEs 204-206 without the active discharge circuit 210. As shown in the example of FIG. 4A, gate driver-power transistor pairs including gate drivers 402-412 connected to power transistors 420-430 form the high voltage traction inverter circuit 102 and can be selectively activated in various phases/modes to dissipate energy stored in the HVESEs through motor winding resistance and on-state resistance of the power transistors.

In certain examples, an active discharge function or state is implemented without additional active discharge circuity 210 and instead by introducing new operation modes to the traction inverter 102. With introduction of the new operation modes for the inverter circuit 102, energy stored in the HVESEs 204-206 are dissipated through motor 114 winding resistance and on-state resistance of the power transistors 420-430.

In certain examples, the active discharge function is triggered by a microcontroller unit (MCU), such as the control module 120, etc., to generate specific pulse width modulation (PWM) patterns when conventional gate drivers are used. In other examples, the gate drivers 402-412 include an active discharge support function that can enable operation of active discharge modes in case the MCU fails and/or is unavailable.

Figure 4B:
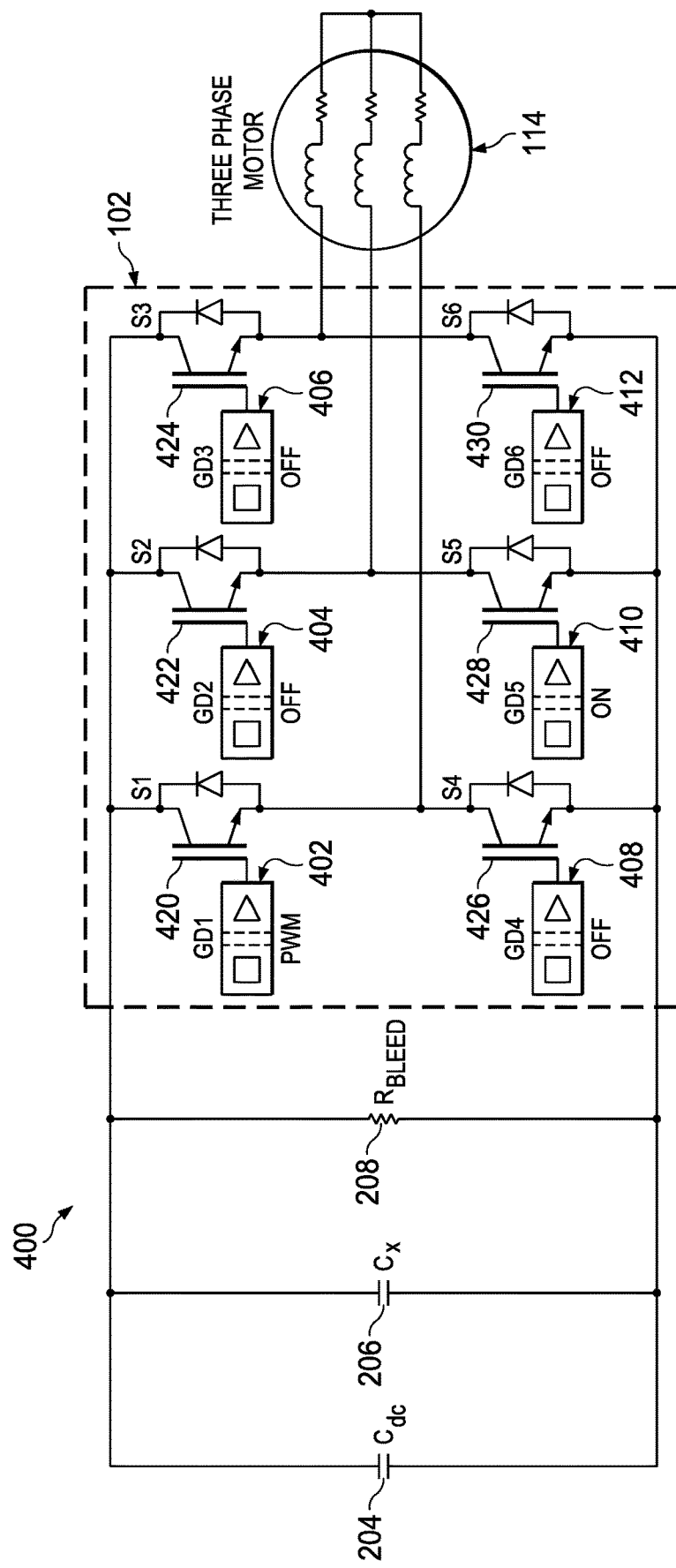

FIG. 4B illustrates the example circuit 400 in a configuration to facilitate energy dissipation with the three-phase inverter circuitry 102. As shown in the example of FIG. 4B, the gate driver 402 generates a PWM pattern and one gate driver 410 is turned ON (e.g., goes HIGH) while the remaining gate drivers 404-408, 412 are OFF (e.g., are brought LOW). By activating the gate driver 410 with PWM from the gate driver 402, motor 114 winding inductors can be leveraged with the power transistors 420, 428 to dissipate energy stored in the HVESEs 204-208, for example.

Figure 5:
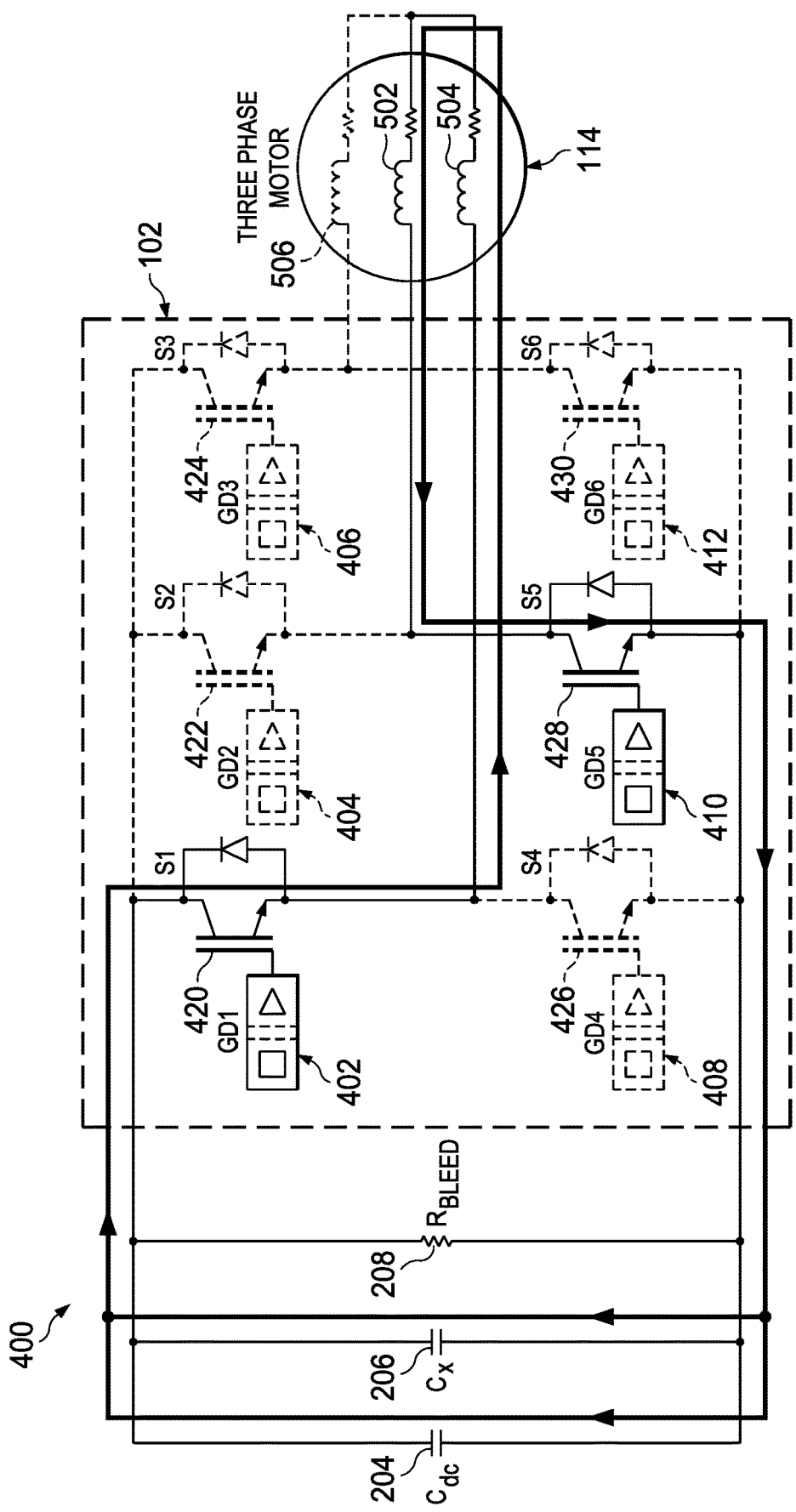
FIG. 5 illustrates an example operational view of the circuit of FIGS. 4A-4B in a half bridge configuration and in a first operating mode.

FIG. 5 illustrates an example operational view of the circuit 400 of FIGS. 4A-4B in a half bridge configuration and in first operating mode using phases A and B of the three-phase inverter circuit 102, which includes phases A, B, and C. In the first operating mode, power transistors S2 422, S3 424, S4 426, and S6 430 are OFF while power transistors S1 420 and S5 428 are ON. Energy stored in capacitors Cdc 204 and Cx 206 is transferred to motor winding inductors 502, 504 of phases A and B of the motor 114. In this example, the inductor 506 of phase C is not used. In other examples, the motor winding inductor 506 of phase C can be used instead of or in addition to the windows 502, 504 of phases A and B.

Figure 6:
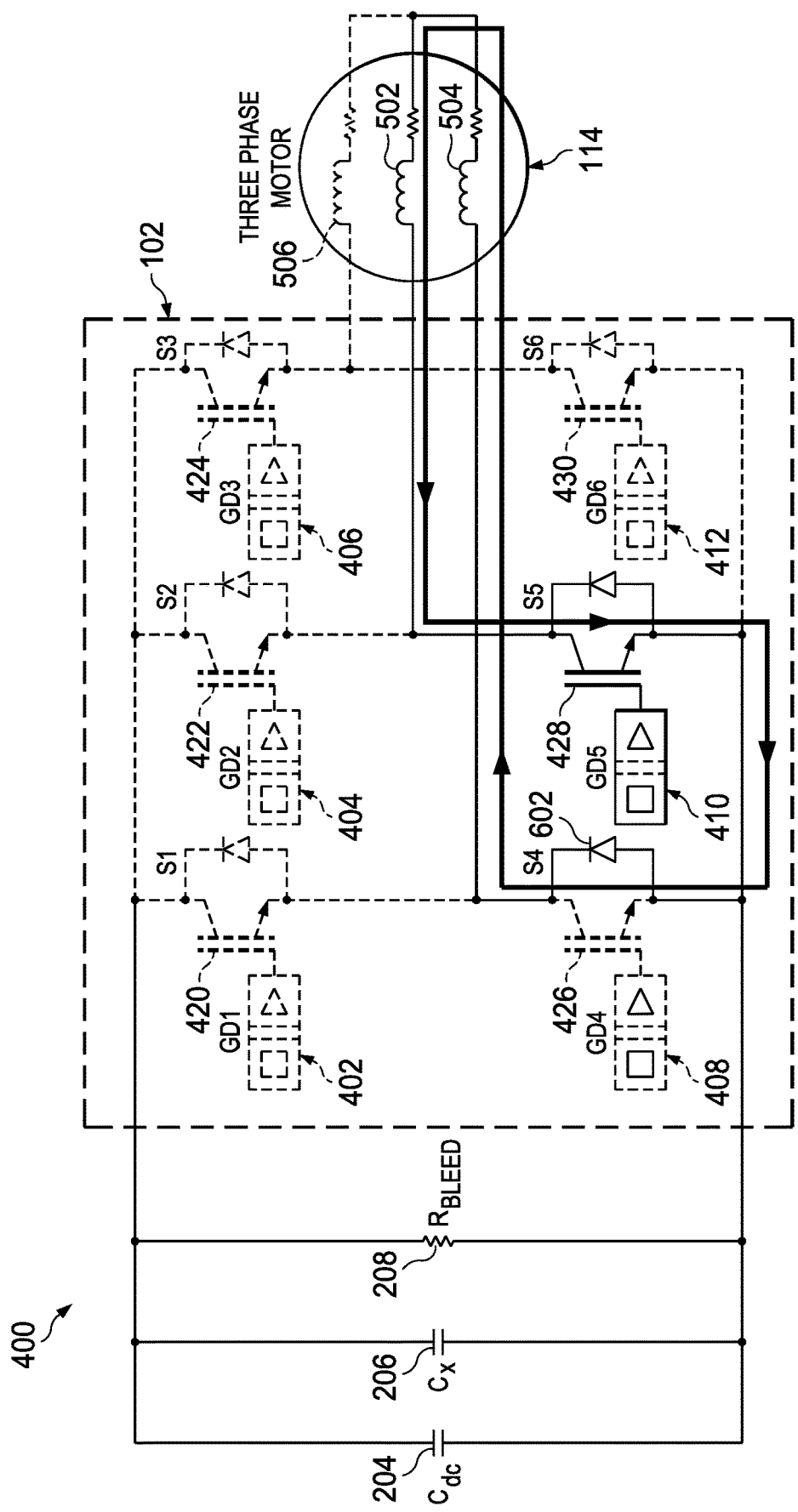
FIG. 6 illustrates an example operational view of the circuit of FIGS. 4A-4B in a half bridge configuration and in a second operating mode.

FIG. 6 illustrates an example operational view of the circuit 400 of FIGS. 4A-4B in a half bridge configuration and in second operating mode using phases A and B of the three-phase inverter circuit 102. In the second operating mode, power transistors S1 420, S2 422, S3 424, S4 426, and S6 430 are OFF while power transistor S5 428 is ON. In the second operating mode, the current of the motor winding inductors 502, 504 freewheels through transistor S5 428 and a body diode 602 of transistor S4 426. In this example, the inductor 506 of phase C is not used. In other examples, the motor winding inductor 506 of phase C can be used instead of or in addition to the windows 502, 504 of phases A and B.

Thus, both first and second operating modes of the inverter circuitry 102 allow energy stored in the capacitors 204, 206 to be dissipated to avoid damage to the circuit 100, 400 and any user, device, etc., that may come in contact with the circuit 100, 400. Rather than requiring additional discharge circuitry 210, adjustment of operating modes of the inverter circuit 102 and attached motor 114 enable faster, smaller, more efficient, and more affordable power discharge. Power losses are introduced in both operation modes to dissipate stored energy through the activated power transistor(s) 420-430 as a function of one or more of a) current times resistance (I×R), where I represents current and R represents motor winding resistance, b) current times a saturation voltage between collector and emitter terminals ($V_{CE(sat)}$) of the respective power transistor 420-430 (I×$V_{CE(sat)}$), c) current times a drain-source voltage of an "ON" power transistor 420-430 (I×$V_{DS(on)}$), where $V_{CE(sat)}$ and $V_{DS(on)}$ represent an on-state voltage of the power device, etc.

In certain examples, each gate driver 402-412 supports active discharge without requiring additional discharge circuitry 210. The gate driver(s) 402-412 support a high voltage DC bus sense function to detect voltage level in the circuit 400 (e.g., in the capacitor(s) 204, 206, etc.) and trigger a fail-safe state when the voltage level exceeds a voltage or energy or charge threshold and/or other condition triggers a power reduction. In certain examples, the fail-safe state is programmable, and, during power-up, each gate driver 402-412 is programmed with a fail-safe state to instruct the gate driver 402-412 how to operate when the fail-safe state is triggered. For example, each gate driver 402-412 can be programmed to turn ON (go HIGH), OFF (go LOW), and/or generate PWM (e.g., with a 50% duty ratio, etc.) in the fail-safe state.

Thus, as shown in the examples of FIGS. 4B-6, each gate driver 402-412 is programmed to operate in a certain way (e.g., OFF, ON, PWM, etc.) to control the circuit 102 to work with a plurality of phases 502-504 of the motor 114 to dissipate power stored in components of the circuit 400 including capacitors 204, 206, etc. In certain examples, the fail-safe mode is triggered for active discharge in case of excess voltage, controller failure, etc., and the inverter circuit 102 operates in an active discharge mode as dictated by the driver 402-412 fail safe states until the DC bus voltage is reduced to a voltage level that is safe for humans, avoids damaging other components, etc.

Figure 7:
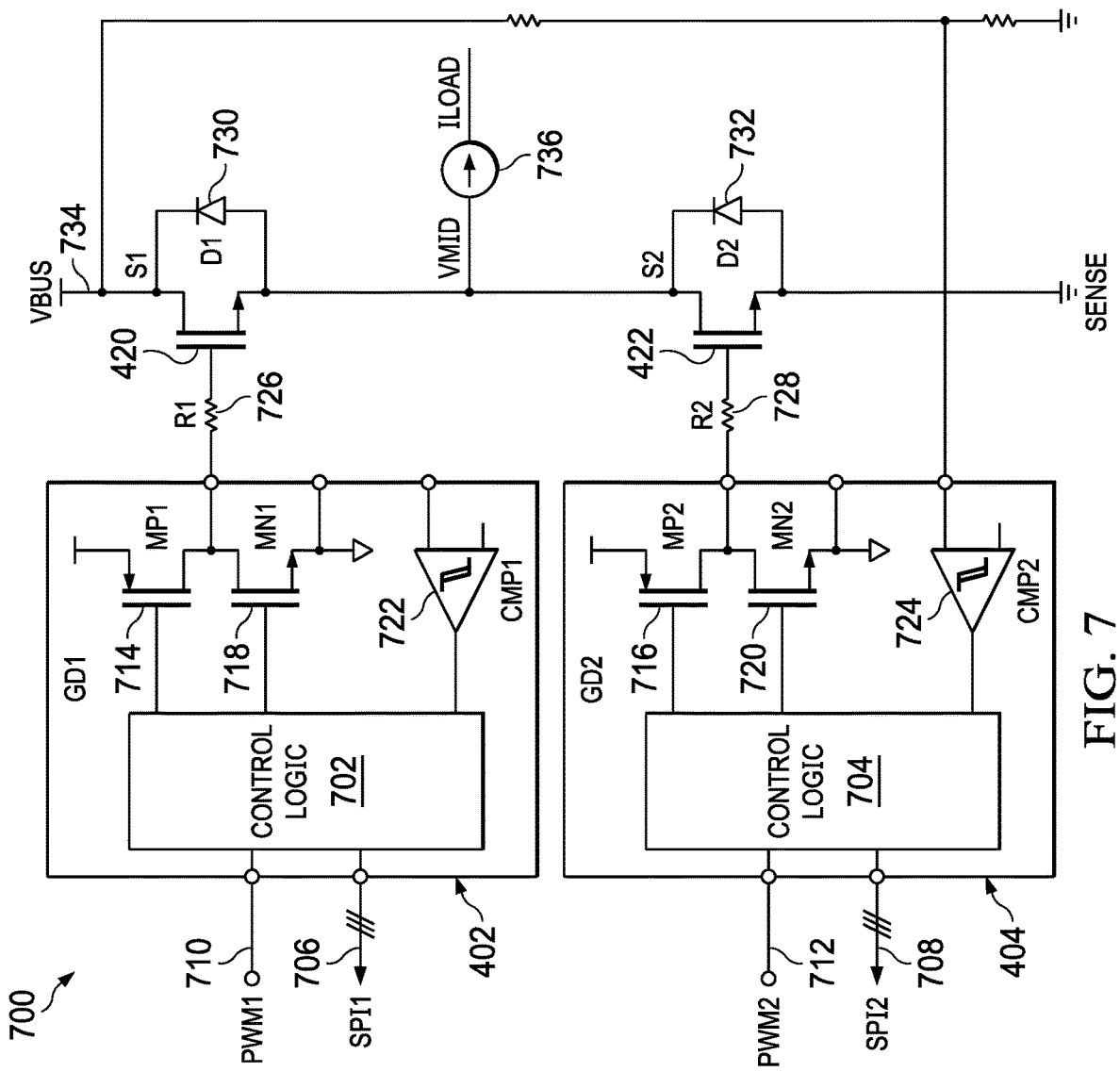
FIG. 7 illustrates an example half bridge configuration of the gate drivers and associated power transistors of the circuit of FIGS. 4A-4B.

FIG. 7 illustrates an example half bridge configuration 600 of the gate drivers 402, 404 and associated power transistors 420, 422. Each gate driver 402, 404 includes control logic 702, 704 to control operation of the respective gate driver 402, 404 based on its mode (e.g., normal operating mode, fail-safe mode, ON, OFF, PWM, etc.). The mode can be set by a control signal, such as a control signal sent on a serial peripheral interface (SPI) bus control 706, 708. For example, a control signal can determine which gate drivers 402, 404 are turned off, on, generating PWM, etc., for a given circuit configuration. Each control logic 702, 704 can also generate a PWM signal 710, 712, depending on its mode or state, for example.

The control logic 702, 704 of the respective gate driver 402, 404 can be used to drive a gate of the associated power transistor 420, 422 using a PMOS transistor (MP) 714, 716 and an NMOS transistor (MN) 718, 720 as part of the inverter circuit 102. Each transistor 714-720 acts as a load of the other transistor 714-720 in the respective gate driver 402, 404. Each gate driver 402, 404 includes a comparator 722, 724 to process voltage information to evaluate a status of energy dissipation and control a mode of the control logic 702, 706 for the respective gate driver 402, 404, for example.

The output of the gate driver 402, 404 is connected to the power transistor 420, 422 via a resistor 726, 728. The power transistor device 420, 422 includes a body diode 730, 732. The transistor 420, 422 and its body diode 730, 732 can help dissipate stored energy depending on the mode of the gate driver 402, 404, for example. The power transistors 420, 422 are connected by a bus 734 to a current load ($I_{LOAD}$) 736.

Thus, certain examples provide a special, improved gate driver 402-412 that can activate a special mode to discharge capacitors 204, 206 and/or other HVESEs connected to the circuit 100, 400. The gate driver 402-412 has three modes—high/on, low/off, or PWM depending upon a control signal sent to the driver 402-412. A fail-safe input can be provided to each gate driver 402-412, which dictates the gate driver's response. The gate driver's operation mode can be configured through the SPI 706-708, but, when the gate driver 402-412 receives the fail-safe signal, the driver 402-412 enters a discharge mode and begins facilitating discharge according to its role in the configuration (e.g., ON, OFF, PWM, etc.). The comparator 722, 724 works with the control logic 702, 704 as a high voltage sensing circuit to determine an end point of the active discharge phase (e.g., when sufficient energy has been discharged/dissipated to transition back to a normal operation mode from the active discharge mode, etc.), for example.

Figure 8:
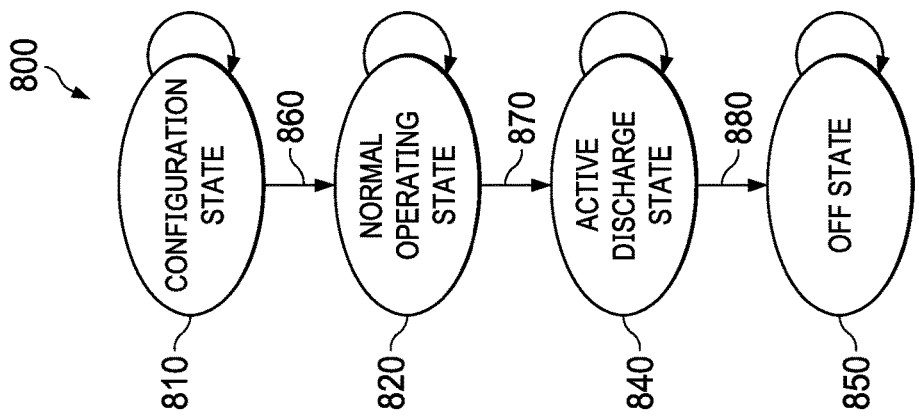
FIG. 8 illustrates a diagram of example states or modes of operation for the gate drivers of FIGS. 4A-7.

FIG. 8 illustrates a diagram 800 of example states or modes 810-850 of operation for the gate drivers 402-412. As shown in the example of FIG. 8, the gate driver 402-412 begins in a configuration state 810. In the configuration state 810, active discharge operation can be configured, normal device operation can be configured, etc., using one or more settings/parameters/instructions in the configuration state 810. The gate driver 402-412 is in the configuration state 810 until the driver 402-412 receives a command 860 to start normal operation.

Receipt of the command 860 triggers the gate driver 402-412 to enter a normal state 820 of operation. The gate driver 402-412 remains in the normal operating state 820 until an active discharge command 870 and/or other fail-safe signal is received.

Receipt of the active discharge command 870 puts the gate driver 402-412 in an active discharge state/mode 830. In the active discharge state 830, the gate driver 402-412 has a particular role or mode that has been programmed for gate driver 402-412 operation when the active discharge command/fail-safe signal 870 is received. Thus, the gate driver 402-412 can be ON/ACTIVATED, OFF/DEACTIVATED, or in PWM generation mode based on its configuration and/or mode of operation, for example.

For example, the gate driver 402-412 can have a first operating mode and a second operating mode in the active discharge state 830. The configuration state 810 set the mode of the respective gate driver 402-412 to on, off, or PWM generation, depending on the role of the respective gate driver 402-412 and associated power transistor 420-430 in the mode of operation, for example.

Once in its programmed fail-safe discharge mode (ON/ACTIVATED/HIGH, OFF/DEACTIVATED/LOW, or PWM), the gate driver 402-412 operates according to its active discharge mode until the sensing circuitry (e.g., the comparator 722, 724 working with control logic 702, 704, etc.) indicates 880 that stored energy has been discharged below the fail-safe energy threshold. The signal 880 indicating that the charge is below the energy threshold transitions the gate driver 402-412 to an OFF state 850.

Figure 9:
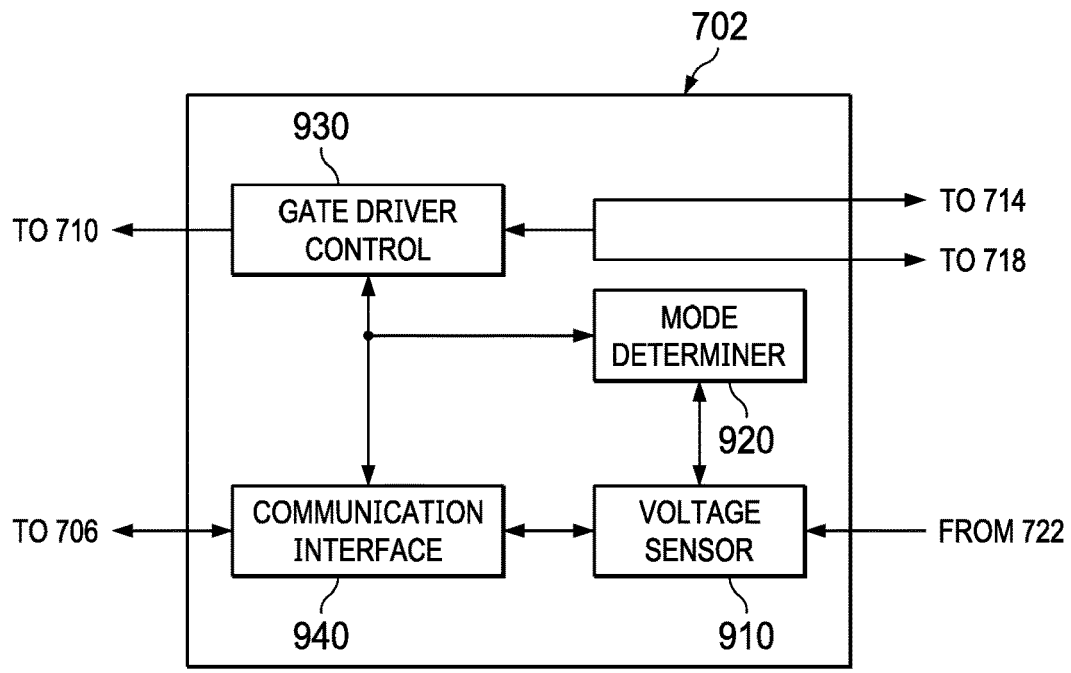
FIG. 9 illustrates an example implementation of the controller of FIG. 7.

FIG. 9 illustrates an example implementation of the controller/control logic 702 of the example of FIG. 7 to control the gate driver 402 of the inverter circuit 102. While the controller 702 and gate driver 402 are used as an example, the implementation can apply to any control logic 702, 704 associated with any gate driver 402-412. The example controller 702 of FIG. 9 includes a voltage sensor 910, a mode determiner 920, a gate driver control 930, and a communication interface 940.

The example voltage sensor 910 is to measure a voltage representing stored energy of the capacitor 204, 206 connected to the inverter circuit 102. The example mode determiner 920 is to set the mode of operation of the gate driver 402. The mode of operation includes a first operating mode and a second operating mode in the active discharge state 820, for example. The mode of operation can be triggered when the controller 702 is placed in the active discharge state 820 by a fail-safe signal generated by the voltage sensor 910 when the measured voltage exceeds a threshold (e.g., a charge/voltage threshold set to prevent damage to a human user and/or connected electrical components, etc.). For example, when excess charge builds on the capacitor(s) 204 and/or 206, the voltage sensor 910 detects the excess in comparison to the voltage threshold and triggers the fail-safe signal to place the controller 702 in the active discharge state 820.

The example gate driver control 930 controls the gate driver 402 to set, based on the mode of operation, the gate driver 402 to ON 830, OFF 840, or generate a PWM signal 850, for example. The example communication interface 940 (e.g., an SPI to interface with the SPI input 706, etc.) receives configuration and/or command input, outputs status and/or relays command/configuration, etc.

When the mode determiner 920 determines that the mode of operation is the first operating mode, the mode determiner 920 processes a configuration for the gate driver 402 to determine whether the gate driver 402 is to be set to on 830, off 840, or PWM 850. Based on the target state 830-850 for the gate driver 402, the gate driver control 930 controls the gate driver 402 to set, based on the configuration and mode of operation, the gate driver 402 to bring the gate driver high 830, low 840, or to generate a PWM signal 850, for example. The gate driver 402 then impacts its connected power transistor 420 accordingly, for example. That is, when the gate driver 402 is on 830, the gate driver 402 activates or switches "on" the power transistor 420. When the gate driver 402 is off 840, the gate driver 402 deactivates or switches "off" the power transistor 402. When the gate driver 402 is in PWM mode 850, the gate driver 402 sends a PWM signal 710 to the inverter circuitry 102.

Using the example controller 702, when in the first operating mode, stored energy from capacitor(s) 204, 206 is to be transferred from the capacitor 204, 206 to the motor winding inductors 502, 504 connected to the inverter circuit 102 via the power transistor 420 activated by the gate driver 402 to dissipate a first portion of the stored energy, for example. Then, when in the second operating mode, a second portion of the stored energy is to be transferred from the motor winding inductors 502, 504 to the power transistor 420 (and diode 602) to dissipate the second portion of the stored energy, for example.

When the voltage sensor 910 determines that the voltage across the capacitor(s) 204, 206 no longer exceeds the voltage threshold, then the controller 702 can be taken out of the active discharge state 820 and back to the normal operating state 810, ceasing the second operating mode. Otherwise, the mode determiner 920 and the gate driver control 930 can continue to alternate between the first operating mode and the second operating mode to dissipate stored energy through the inductive motor windings 502, 504 and the power transistor 420, for example.

While the components 910-940 have been shown together as part of the control logic 702 (and/or 704) of FIG. 7, some or all of these components 910-940 can be provided, alternatively or additionally, in the example controller 120 for the inverter circuit 102 in FIGS. 1, 2, and/or 3.

While example implementations of the apparatus 100, 400, 700 are illustrated in FIGS. 1-9, one or more of the elements, processes and/or devices illustrated in FIGS. 1-9 can be combined, divided, re-arranged, omitted, eliminated and/or implemented in any other way. Further, the example control module 120, example control module 122, example control logic 702, example control logic 704, and/or more generally the example circuity 100, 400, and/or 700 of FIGS. 1-9 can be implemented by hardware, software, firmware and/or any combination of hardware, software and/or firmware. Thus, for example, any of the example control module 120, example control module 122, example control logic 702, example control logic 704, and/or more generally the example circuity 100, 400, and/or 700 of FIGS. 1-9 can be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example control module 120, example control module 122, example control logic 702, example control logic 704, and/or more generally the example circuity 100, 400, and/or 700 of FIGS. 1-9 is/are hereby expressly defined to include a non-transitory computer readable storage device or storage disk such as a memory, a digital versatile disk (DVD), a compact disk (CD), a Blu-ray disk, etc. including the software and/or firmware. Further still, the example control module 120, example control module 122, example control logic 702, example control logic 704, and/or more generally the example circuity 100, 400, and/or 700 of FIGS. 1-9 can include one or more elements, processes and/or devices in addition to, or instead of, those illustrated in FIGS. 1-9, and/or may include more than one of any or all of the illustrated elements, processes and devices.

Figure 11:
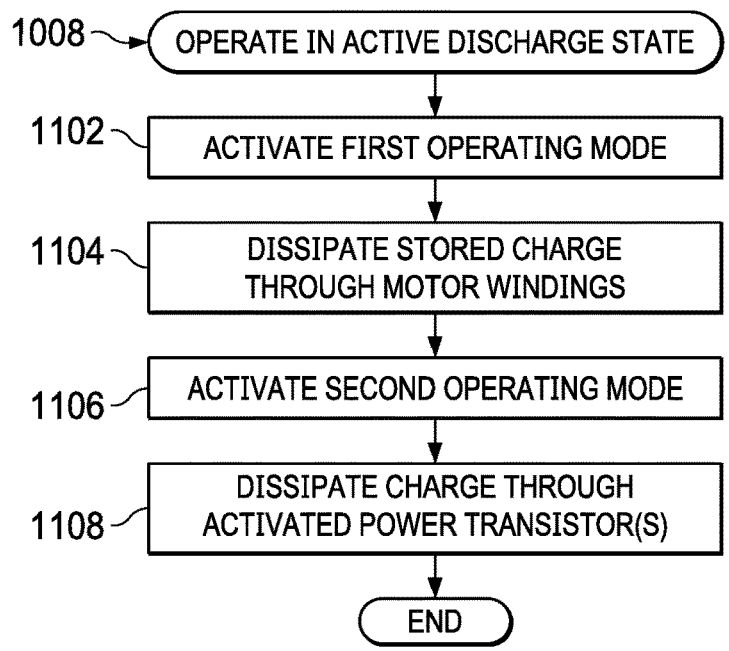
FIGS. 10-11 are flowcharts representative of example machine readable instructions that can be executed to implement and/or operate the example controller of FIGS. 7 and 9.
Figure 10:
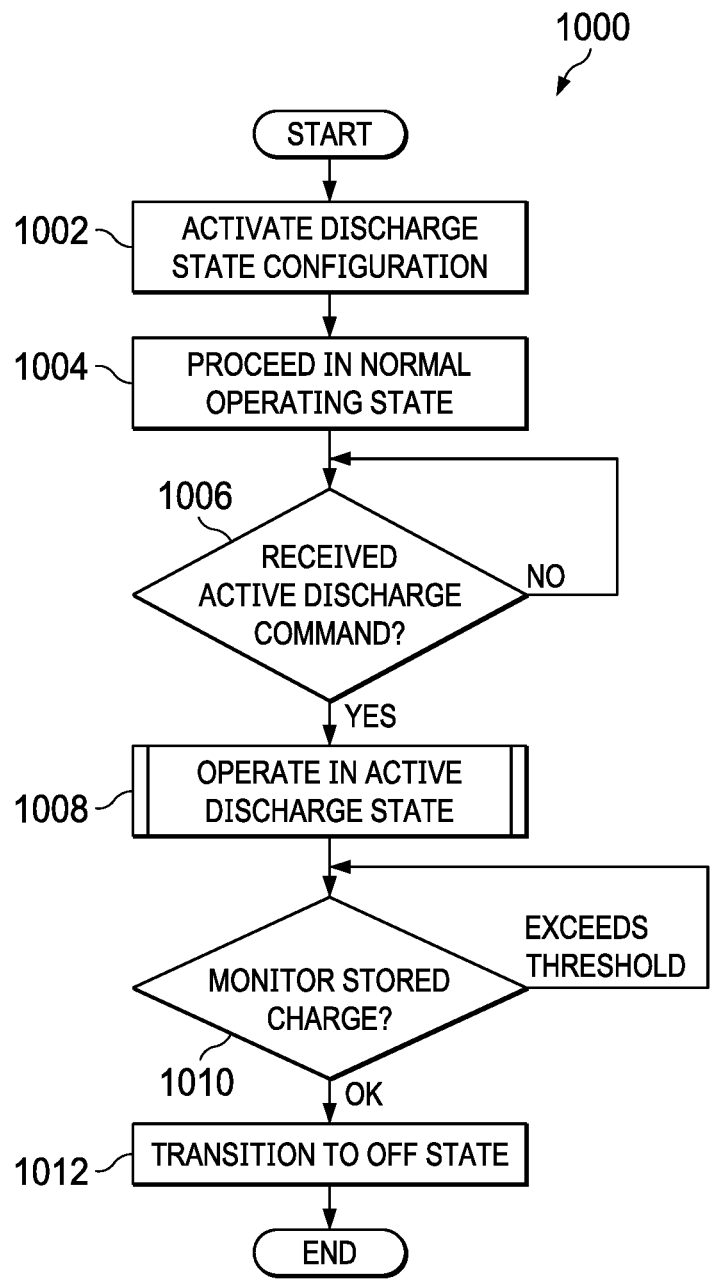

Flowcharts representative of example machine readable instructions for implementing, programming, and/or controlling the circuit 100, 400, and/or 700 of FIGS. 1-9 are shown in FIGS. 10-11. Such instructions can be executed by a microcontroller and/or other processor in the example control module 122, control logic 702, and/or control logic 704 and/or can be hardcoded in hardware and/or firmware as part of the example control module 122, control logic 702, and/or control logic 704. In certain examples, the machine readable instructions form a program for execution by a processor and can be embodied in software stored on a non-transitory computer readable storage medium such as a flash memory, universal serial bus (USB)-accessible storage, read only memory (ROM), random access memory (RAM), disk storage, and/or other processor memory, but the entire program and/or parts thereof can alternatively be executed by a device other than the processor and/or embodied in firmware or dedicated hardware. Further, although the example program is described with reference to the flowcharts illustrated in FIGS. 10-11, many other methods of implementing, programming, and/or controlling the example circuitry 100, 400, and/or 700 can alternatively be used. For example, the order of execution of the blocks can be changed, and/or some of the blocks described can be changed, eliminated, or combined. Additionally or alternatively, any or all of the blocks can be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 10-11 can be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

FIG. 10 is an example flowchart 1000 representative of example machine readable instructions that may be executed to implement and/or operate the example control module 122, control logic 702, and/or control logic 704 of FIGS. 1-9 to control operation of the circuitry 100, 400, and/or 700 including active discharge of stored energy. Although the instructions of FIG. 10 are described in conjunction with the example apparatus 100, 400, 700 of FIGS. 1-9, the example instructions may be utilized by any interface circuitry to instruct and/or control operation of power circuitry to dissipate excess stored charge.

At block 1002, an active discharge state configuration is provided to the example circuit 102. For example, the active discharge state configuration (e.g., on, off, PWM, etc.) is provided to the circuit 102 via the SPI 706, 708. At block 1004, the example circuit 102 proceeds in a normal operating state. When activated, the example circuit 102 can provide power to one or more connected devices or HVESEs, such as a high voltage DC link capacitor, an X capacitor, etc. For example, the control module 120 triggers the inverter circuit 102 to provide power from the motor 114 to capacitors 204, 206.

At block 1006, receipt of an active discharge command and/or other fail-safe trigger is evaluated. For example, if a stored charge exceeds a charge threshold, then the charge can harm a human user and/or another connected electrical component, and an active discharge state command is generated to trigger the circuit 102. If the stored charge is less than the charge threshold, then the charge does not pose a threat to be remediated.

At block 1008, when the active discharge command is received (e.g., stored charge exceeds the charge threshold, etc.), the circuit 102 operates in the active discharge state. For example, as shown in FIGS. 4B and 5, in a first operating mode, gate driver 402 operates in a PWM generating mode while gate drivers 404, 406, 408, 412 are OFF, and gate driver 410 is ON. Then, in a second operating mode, as shown in FIG. 6, gate driver 410 is activated, while gate drivers 402, 404, 406, 408, and 412 are off, with the body diode 602 of power transistor 426 also activated to help dissipate charge stored in the motor 114 inductor windings 502, 504, for example.

At block 1010, the charge stored in one or more HVESEs 204, 206 is again monitored to determine whether the stored charge still exceeds the charge threshold. If so, the circuit 102 continues alternating modes in the active discharge state. If, however, the charge threshold is satisfied (e.g., the measured charge is less than the charge threshold, etc.), then, at block 1012, the circuit 102 transitions to an off state. Thus, for example, once in its programmed fail-safe discharge mode (ON, OFF, or PWM), the gate driver 402-412 operates according to its active discharge state until the sensing circuitry (e.g., the comparator 722, 724 working with control logic 702, 704, etc.) indicates that stored energy has been discharged below the fail-safe threshold so that normal operation of the circuit 100, 400, 700 can resume.

FIG. 11 provides additional detail regarding an example implementation of operating in an active discharge state (block 1010 of the example process 1000 of FIG. 10). At block 1102, a first operating mode is activated by the controller. For example, the control module or controller 120 sends a signal over the SPI 706, 708 to the control logic 702, 704 of the gate drivers 402-412 to initiate operation of the inverter circuitry 102 in the first operating mode of the active discharge state. For example, each gate driver 402-412 is set to on/high, off/low, or PWM mode depending upon its role in the first operating mode.

At block 1104, when in the first operating mode, stored energy from the capacitor 204 and/or 206 is to be transferred from the capacitor 204, 206 to at least a portion of the motor winding inductors 502, 504 via at least one activated power transistor 402-412 to dissipate a first portion of the stored energy. Thus, as shown in the example of FIG. 5, in the first operating mode, the gate driver 402 is instructed to generate a PWM signal through its associated power transistor device 420, the gate driver 410 is turned on to activate associated power transistor device 428, and the gate drivers 404, 406, 408, and 412 are turned off. Activated gate driver 402 is to provide the PWM signal to control the motor 114 to drive dissipation of the stored energy from capacitors 204 and/or 206 through the inductor windings 502, 504, for example.

At block 1106, a second operating mode is activated by the controller. For example, the control module or controller 120 sends a signal over the SPI 706, 708 to the control logic 702, 704 of the gate drivers 402-412 to initiate operation of the inverter circuitry 102 in the second operating mode of the active discharge state. For example, each gate driver 402-412 is set to on/high, off/low, or PWM mode depending upon its role in the first operating mode.

At block 1108, when in the second operating mode, a second portion of the stored energy is to be transferred from the motor winding inductors 502, 504 to at least one activated power transistor 420-430 to dissipate the second portion of the stored energy. For example, as shown in FIG. 6, the gate driver 410 is turned on to activate associated power transistor device 420, while gate drivers 402, 404, 406, 408, and 412 are off, with the body diode 602 of power transistor 426 also activated to help dissipate charge stored in the motor 114 inductor windings 502, 504, for example.

Thus, in the first operating mode, energy stored in the capacitors 204 and/or 206 is routed to the inductor windings 502, 504 of the motor 114 by one or more gate drivers 402-412 and associated power transistor devices 420-430. The inductor windings 502, 504 absorb the energy stored in the capacitor(s) 502, 504 and dissipate some of that energy. The inverter circuit 102 then switches to the second operating mode, in which current from the motor windings 502, 504 freewheels through one or more power transistors 420-430 and/or body diodes 602. Through resistance of the windings 502, 504 and on-state voltage of the power device(s) 420-430, 602, stored charge held in the capacitor(s) 204, 206, which may prove damaging to a human user and/or other attached automotive/accessory circuitry, can be dissipated by the inverter circuitry 102, 400, for example.

Thus, certain examples provide two new operation modes to enable the inverter circuit 102 to implement an active discharge function without introducing additional components. Certain examples provide a new gate driver with integrated features to support an active discharge function in case of MCU failure. A HV sensing circuit is provided in the driver 402-412 to determine an end point of the active discharge mode/phase. In certain examples, an SPI interface is provided to enable configuration of a default fail-safe state and/or other operation of the gate drivers 402-412, such as in the active discharge mode (e.g., in a state/mode such as HIGH/ON/ACTIVATED, LOW/OFF/DEACTIVATED, PWM, etc.).

Figure 12:
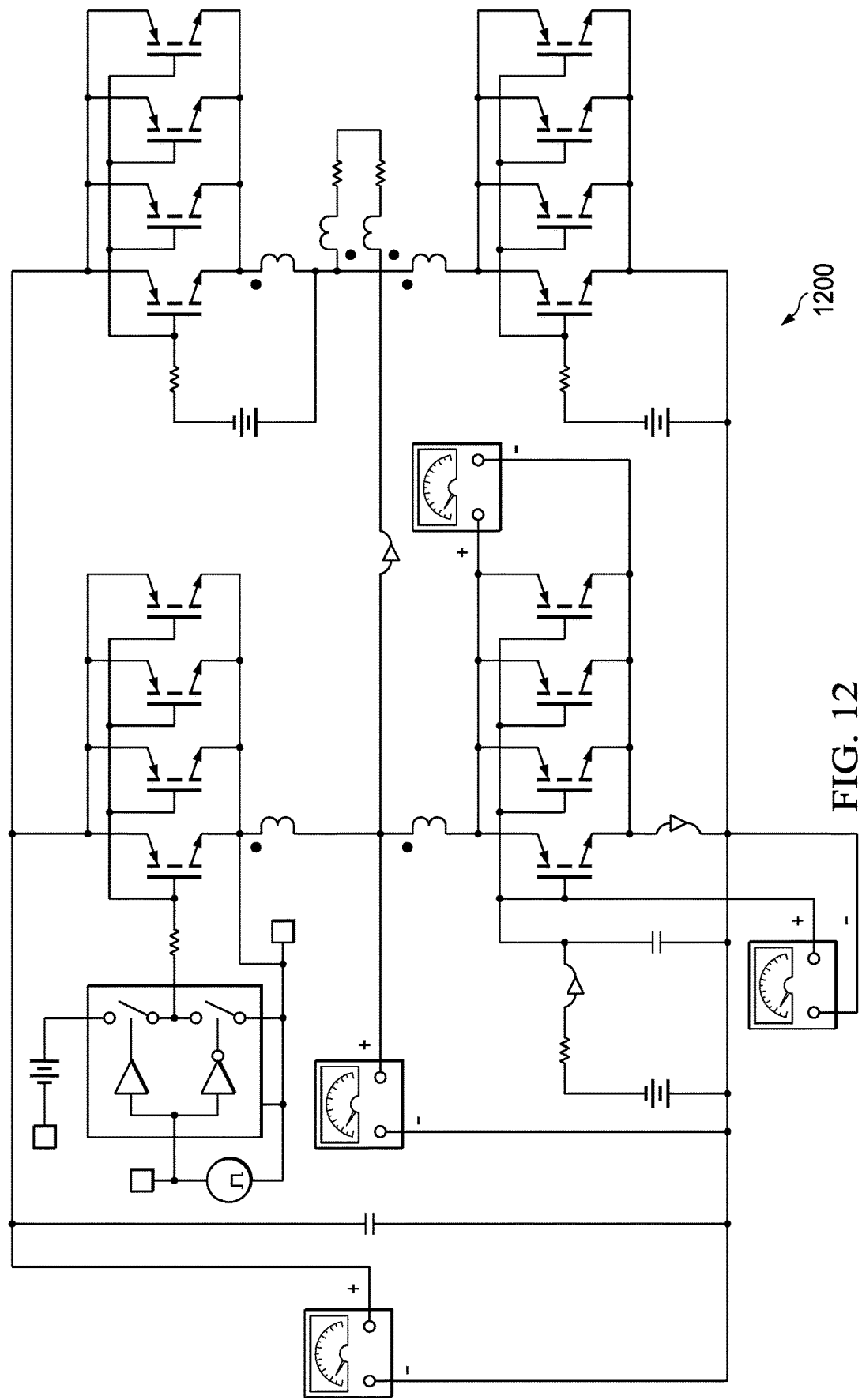
FIGS. 12-14 depict example simulation and results of the inverter circuit of FIGS. 4A-7 in an active discharge state.

FIG. 12 depicts an example simulation 1200 of the inverter circuit 102 in an active discharge mode or configuration. In the simulation 1200, DC link capacitance 204 is 1 mF and initial capacitor voltage is 400 V. A load inductance is 1 mH, and load resistance is 10 mΩ. A PWM signal is generated with a frequency of 10 kHz and a duty cycle of 50%. Simulation results 1300 and 1400, shown in FIGS. 13 and 14, respectively, show that energy in the DC link capacitor 204 is discharged smoothly, with voltage decreasing from 400 V to 0 V in a few milliseconds, for example.

Figure 13:
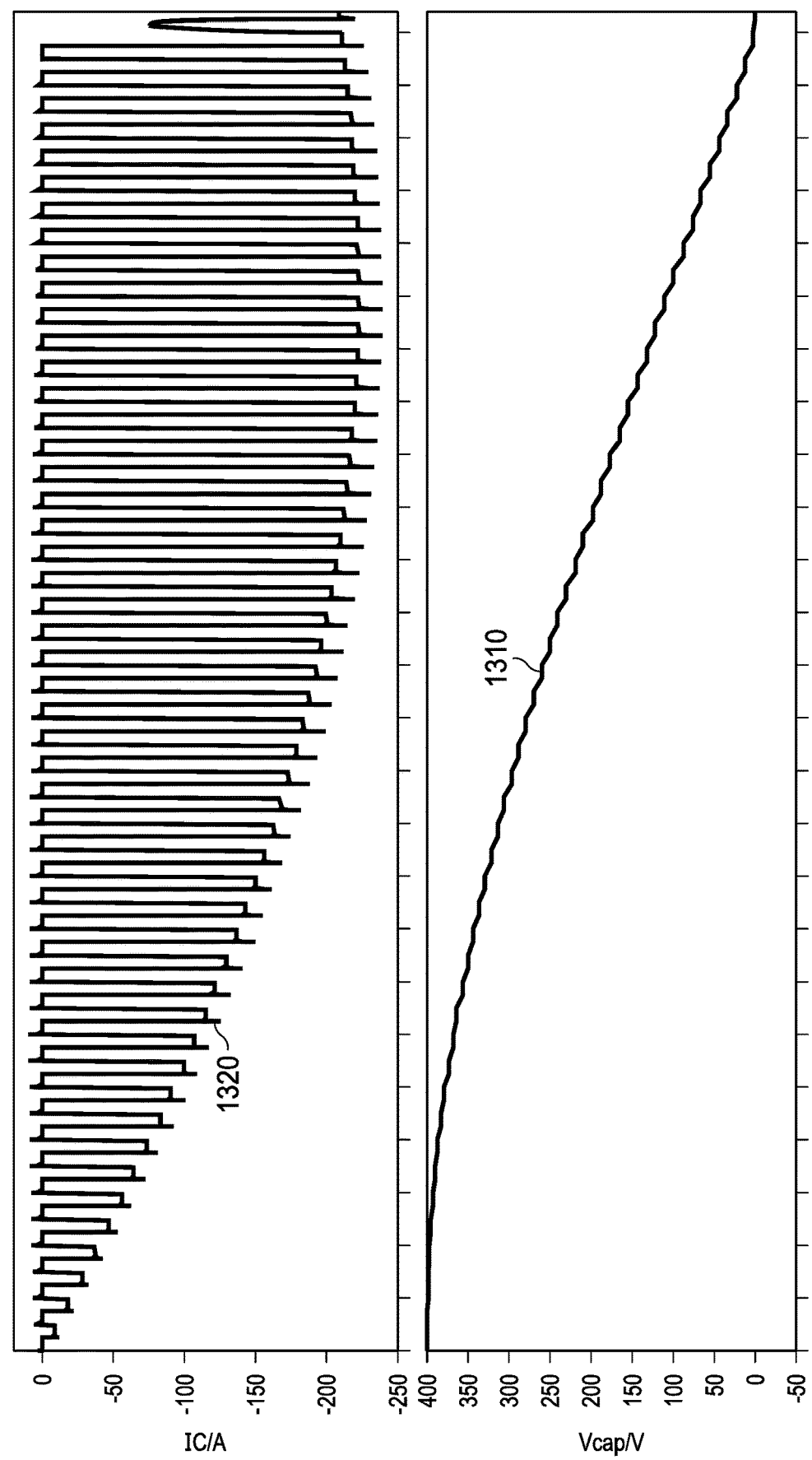

FIG. 13 illustrates example results 1300 showing a capacitor voltage 1310 with respect to activated switch current 1320. As demonstrated in the results of FIG. 13, activating the switch current 1320 drives a decrease in capacitor voltage 1310.

Figure 14:
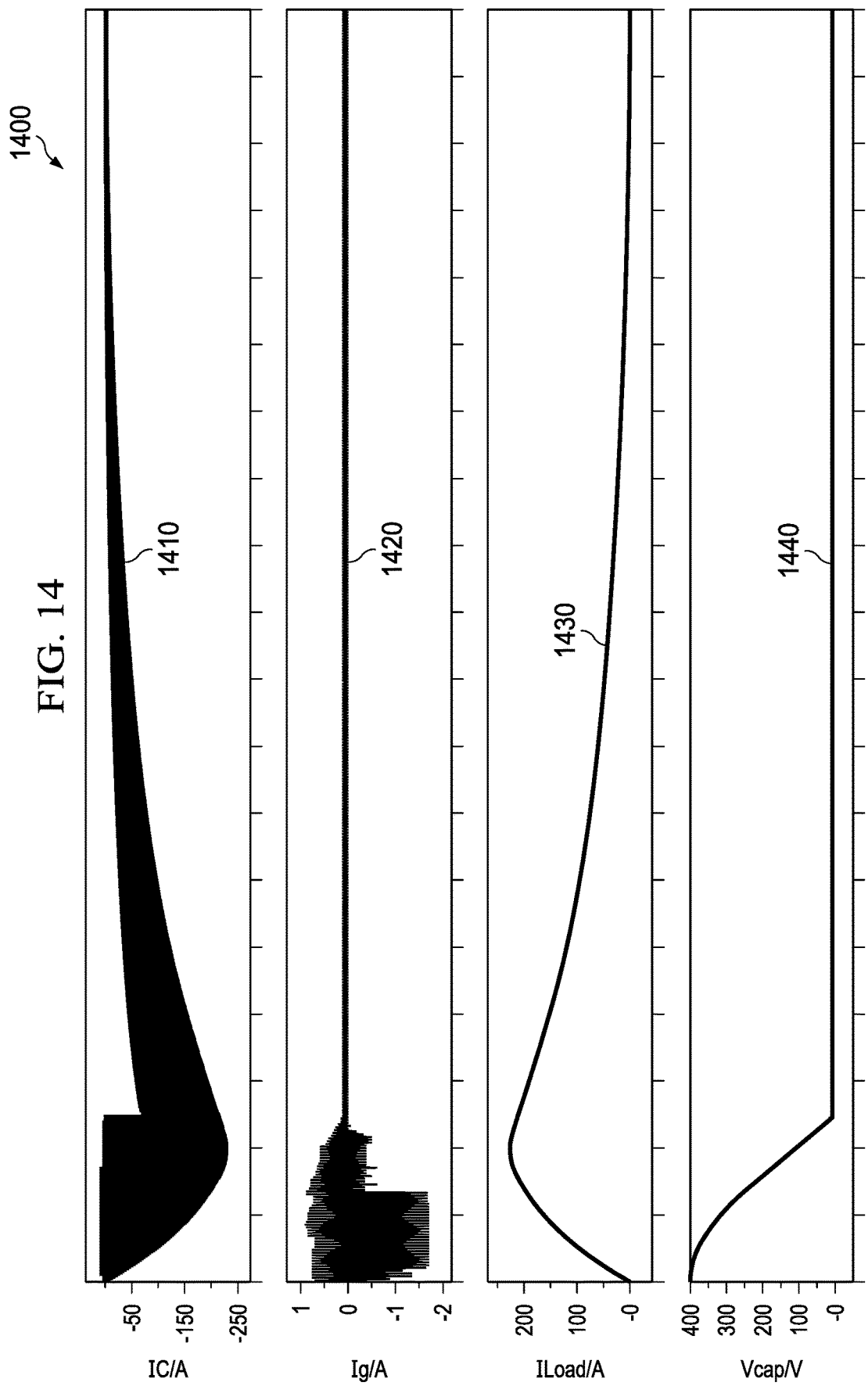

FIG. 14 depicts example results 1400 showing a relationship between current in the inverter circuit 1410, gate current 1420, current load 1430, and capacitor voltage 1440. As shown in the example results of FIG. 14, as the inverter circuit 102 and its gate drivers 402-412 are triggered, the current load ($I_{LOAD}$) 736 and capacitor 204 and/or 206 voltage (Vcap) decrease to a threshold or steady-state (e.g., 0 A, 0V, etc.).

Figure 15:
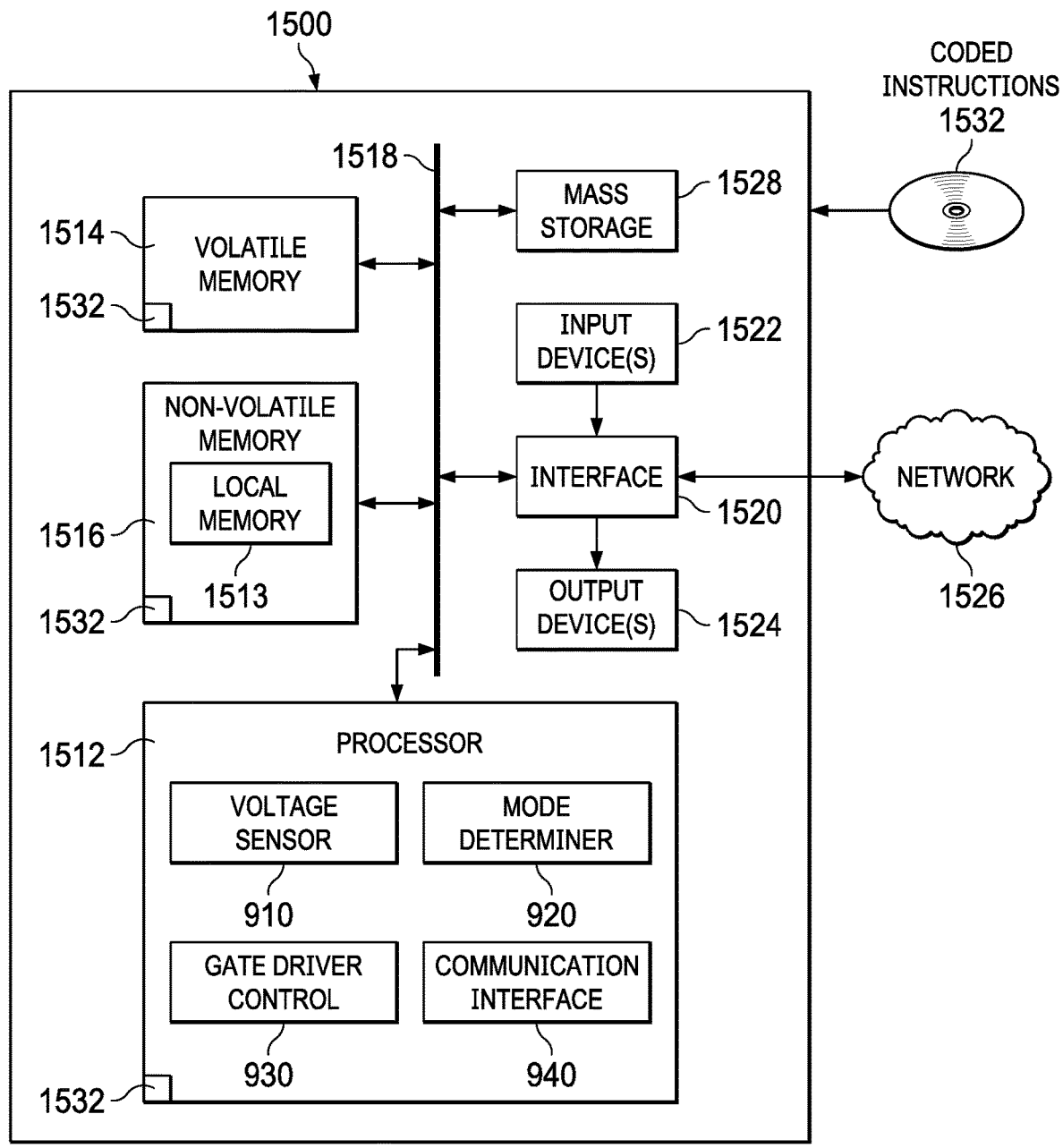
FIG. 15 is an example processor platform that may execute the example computer readable instructions of FIGS. 10-11 to implement the example controller of FIGS. 7 and 9.

FIG. 15 is a block diagram of an example processor platform 1500 structured to execute the instructions of FIGS. 10-11 to implement the controller 702, 704 of FIGS. 7 and/or 9 (and/or the controller 120, 122 of FIGS. 1, 2, and/or 3). The processor platform 1500 can be, for example, a microcontroller, an embedded processor, a server, a personal computer, a workstation, a self-learning machine (e.g., a neural network), a mobile device (e.g., a cell phone, a smart phone, a tablet such as an iPad), a personal digital assistant (PDA), an Internet appliance, an automotive infotainment device, or any other type of computing device.

The processor platform 1500 of the illustrated example includes a processor 1512. The processor 1512 of the illustrated example is hardware. For example, the processor 1512 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example voltage sensor 910, mode determiner 920, gate driver control 930, and communication interface 940 of FIG. 9.

The processor 1512 of the illustrated example includes a local memory 1513 (e.g., a cache). The processor 1512 of the illustrated example is in communication with a main memory including a volatile memory 1514 and a non-volatile memory 1516 via a bus 1518. The volatile memory 1514 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1516 may be implemented by flash memory and/or any other desired type of memory device. Access to the main memory 1514, 1516 is controlled by a memory controller.

The processor platform 1500 of the illustrated example also includes an interface circuit 1520. The interface circuit 1520 may be implemented by any type of interface standard, such as an Ethernet interface, a universal serial bus (USB), a Bluetooth® interface, a near field communication (NFC) interface, and/or a PCI express interface. In some examples, the interface circuit 1520 implements the communication interface 940 of FIG. 9.

In the illustrated example, one or more input devices 1522 are connected to the interface circuit 1520. The input device(s) 1522 permit(s) a user to enter data and/or commands into the processor 1512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1524 are also connected to the interface circuit 1520 of the illustrated example. The output devices 1524 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1520 of the illustrated example, thus, typically includes a graphics driver card, a graphics driver chip and/or a graphics driver processor.

The interface circuit 1520 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1526. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1500 of the illustrated example also includes one or more mass storage devices 1528 for storing software and/or data. Examples of such mass storage devices 1528 include floppy disk drives, hard drive disks, compact disk drives, Blu-ray disk drives, redundant array of independent disks (RAID) systems, and digital versatile disk (DVD) drives.

The machine executable instructions 1532 of FIGS. 10-11 can be stored in the mass storage device 1528, in the volatile memory 1514, in the non-volatile memory 1516, and/or on a removable non-transitory computer readable storage medium such as a CD or DVD.

From the foregoing, it will be appreciated that the above disclosed methods, apparatus, and articles of manufacture have been disclosed to provide discharge of stored energy from elements in an electric circuit. The disclosed methods, apparatus and articles of manufacture improve excess energy discharge by modifying configuration of an inverter circuit with new operating modes to discharge a stored charge without damage to the circuit, without damage to surrounding components, without harm to a user, and without added circuitry for discharge. The disclosed methods, apparatus and articles of manufacture are accordingly directed to one or more improvement(s) in the functioning of a circuit and/or other electronic device using controller to control a plurality of gate drivers to dissipate stored energy from a capacitor and/or other HVESE(s) connected to an inverter circuit apparatus according to at least a first operating mode and a second operating mode. Thus, certain examples solve a technical problem of excess charge buildup in circuit by providing new modes of control of circuit elements to dissipate stored charge to prevent damage to circuitry and users while avoiding an impact of added circuitry on an electronic device. When in a discharge state, a controller follows certain specified rules to activate portions of inverter circuitry in first and second operating modes to discharge excess stored charge from attached electronics, for example.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. An apparatus to control a motor having first, second and third motor-winding inductors, the apparatus comprising:
    an inverter circuit having a first output coupled to the first motor-winding inductor, a second output coupled to the second motor-winding inductor and a third output coupled to the third motor-winding inductor, the inverter circuit coupled to a capacitor and configured to output alternating current in response to energy stored in the capacitor, the inverter circuit comprising:
        a plurality of power transistors, a first portion of the plurality of power transistors coupled to the first motor-winding inductor, a second portion of the plurality of power transistors coupled to the second motor-winding inductor and a third portion of the plurality of power transistors coupled to the third motor-winding inductor; and
        a plurality of gate drivers, each of the plurality of gate drivers coupled to a corresponding power transistor of the plurality of power transistors and configured to switch the corresponding power transistor on or off;
    a controller coupled to the plurality of gate drivers and configured to control the plurality of gate drivers to turn on and off portions of the plurality of power transistors to control the motor; and
    wherein the controller is operable in a first operating mode and a second operating mode to cause the inverter to dissipate the stored energy by:
        activating a first power transistor and a second power transistor of the plurality of power transistors and deactivating the remaining plurality of power transistors to dissipate, in the first mode of operation, the energy stored in the capacitor using the first and second motor-winding inductors; and
        activating the second power transistor of the plurality of power transistors and deactivating the remaining plurality of power transistors to dissipate, in the second operating mode, energy stored in the first and second motor-winding inductors using the second power transistor and a body diode of a third power transistor of the plurality of power transistors.

2. The apparatus of claim 1, wherein the controller is operable to determine a discharge state or a normal operating state based on a charge threshold.

3. The apparatus of claim 2, wherein the controller includes a comparator to determine whether the stored energy exceeds the charge threshold.

4. The apparatus of claim 1, wherein each of the plurality of power transistors includes a body diode, and wherein at least one body diode is operable to dissipate the stored energy.

5. The apparatus of claim 1, wherein the motor includes a three-phase motor and wherein the controller is to use at least two phases of the motor to dissipate the stored energy in the first operating mode and the second operating mode.

6. The apparatus of claim 5, wherein the motor is to include an automotive motor and wherein the capacitor is included in a high voltage energy storage element on a direct current link.

7. The apparatus of claim 1, wherein the controller is to trigger at least a first power transistor to turn on and at least a second power transistor to generate a pulse width modulation signal to control the motor.

8. A method of controlling an electric motor having first, second and third motor-winding inductors coupled to an inverter circuit, the method comprising: providing energy stored in a capacitor, during motor drive operations, to the first, second and third motor-winding inductors through the inverter circuit; comparing, using at least one processor, the energy stored in the capacitor to an energy threshold; triggering, using the at least one processor, a discharge of the stored energy from the capacitor, in response to the stored energy exceeding the energy threshold, by: activating a first power transistor and a second power transistor in the inverter circuit, in a first operating mode, to dissipate a portion of the stored energy through the first and second motor-winding inductors; and activating the second power transistor and deactivating other power transistors included in the inverter circuit, in a second operating mode, to dissipate the stored energy using the second power transistor and a body diode of another power transistor in the inverter circuit; and monitoring a remainder of the stored energy to determine whether the remainder of the charge energy exceeds the energy threshold.

9. The method of claim 8, wherein motor drive operations continues when the remainder of stored energy is less than the energy threshold.

10. The method of claim 8, wherein, during the second operating mode, the stored energy includes energy stored in the first motor-winding inductors.

11. The method of claim 8, wherein during the second operating mode, the stored energy includes energy stored in the first and second motor-winding inductors.

12. The method of claim 8, wherein, during the second operating mode, the stored energy includes energy stored in at least one of the motor-winding inductors and the capacitor.

* * * * *